(12) United States Patent
Djalali et al.

(10) Patent No.: US 11,694,036 B2
(45) Date of Patent: *Jul. 4, 2023

(54) USING NATURAL LANGUAGE CONSTRUCTS FOR DATA VISUALIZATIONS

(71) Applicant: Tableau Software, Inc., Seattle, WA (US)

(72) Inventors: Alex Djalali, Los Gatos, CA (US); Vidya Raghavan Setlur, Portola Valley, CA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 3 days.

This patent is subject to a terminal disclaimer.

(21) Appl. No.: 17/359,387

(22) Filed: Jun. 25, 2021

(65) Prior Publication Data
US 2021/0319186 A1    Oct. 14, 2021

Related U.S. Application Data

(63) Continuation of application No. 16/166,125, filed on Oct. 21, 2018, now Pat. No. 11,055,489.
(Continued)

(51) Int. Cl.
  *G06F 40/30*       (2020.01)
  *G06F 3/0484*      (2022.01)
  (Continued)

(52) U.S. Cl.
  CPC ............ *G06F 40/30* (2020.01); *G06F 3/0481* (2013.01); *G06F 3/0484* (2013.01);
  (Continued)

(58) Field of Classification Search
  CPC .............. G06F 40/211; G06F 40/284; G06F 16/90332; G06F 16/9038; G06F 16/24556; G06F 40/205; G06F 16/904; G06F 16/248
  See application file for complete search history.

(56) References Cited

U.S. PATENT DOCUMENTS 8,306,971 B2 * 11/2012 Stolte .................... G09B 29/00
                                                      707/724
9,405,823 B2    8/2016 Mamou et al.
(Continued)

OTHER PUBLICATIONS

Cimiano, Philipp, et al. "Towards portable natural language interfaces to knowledge bases—The case of the ORAKEL system." Data & Knowledge Engineering 65.2, Nov. 2007, pp. 325-354. (Year: 2007).

(Continued)

*Primary Examiner* — Samuel G Neway
(74) *Attorney, Agent, or Firm* — Morgan, Lewis & Bockius LLP

(57) ABSTRACT

A computing device receives user input to specify a natural language command directed to a data source. In accordance with the user input, the device forms an intermediate expression according to a context-free grammar and a semantic model of data fields in the data source. The natural language command includes (i) a first term that specifies an aggregation type in a first aggregation, (ii) a second term that specifies a data field, in the semantic model, to be aggregated for the first aggregation, and (iii) terms that specify data fields, in the semantic model, to determine grouping for the first aggregation. The device translates the intermediate expression into database queries, executes the database queries to retrieve one or more data sets from the data source, aggregated according to the first aggregation, then generates and displays a data visualization of the retrieved data sets.

20 Claims, 18 Drawing Sheets

Related U.S. Application Data

(60) Provisional application No. 62/742,857, filed on Oct. 8, 2018.

(51) Int. Cl.

| | |
|---|---|
| *G06F 3/0481* | (2022.01) |
| *G06F 16/2455* | (2019.01) |
| *G06F 16/248* | (2019.01) |
| *G06F 40/205* | (2020.01) |
| *G06F 40/284* | (2020.01) |
| *G06F 16/9038* | (2019.01) |
| *G06F 16/904* | (2019.01) |
| *G06F 16/9032* | (2019.01) |
| *G06F 40/211* | (2020.01) |

(52) U.S. Cl.
CPC ...... *G06F 16/248* (2019.01); *G06F 16/24556* (2019.01); *G06F 16/904* (2019.01); *G06F 16/9038* (2019.01); *G06F 16/90332* (2019.01); *G06F 40/205* (2020.01); *G06F 40/211* (2020.01); *G06F 40/284* (2020.01)

(56) References Cited

U.S. PATENT DOCUMENTS

| | | | |
|---|---|---|---|
| 9,501,585 B1* | 11/2016 | Gautam | G06F 16/3328 |
| 9,665,662 B1 | 5/2017 | Gautam et al. | |
| 10,515,121 B1 | 12/2019 | Setlur et al. | |
| 10,698,977 B1 | 6/2020 | Zhang | |
| 11,055,489 B2* | 7/2021 | Djalali | G06F 16/904 |
| 11,294,924 B1 | 4/2022 | Talbot et al. | |
| 2002/0059204 A1* | 5/2002 | Harris | G06F 16/24522 |
| 2007/0300172 A1 | 12/2007 | Runge et al. | |
| 2011/0112837 A1* | 5/2011 | Kurki-Suonio | G10L 15/22 704/235 |
| 2014/0236579 A1* | 8/2014 | Kurz | G06F 40/284 704/9 |
| 2016/0070451 A1 | 3/2016 | Kim et al. | |
| 2017/0109377 A1 | 4/2017 | Baer et al. | |
| 2018/0032576 A1* | 2/2018 | Romero | G06N 3/006 |
| 2018/0129513 A1 | 5/2018 | Gloystein et al. | |
| 2018/0129720 A1 | 5/2018 | Kim et al. | |
| 2018/0144065 A1* | 5/2018 | Yellai | G06F 16/90332 |
| 2019/0018839 A1* | 1/2019 | Ge | G06F 16/3344 |
| 2019/0026318 A1* | 1/2019 | Bertellotti | G06F 16/243 |
| 2019/0138648 A1* | 5/2019 | Gupta | H04L 51/02 |
| 2020/0065385 A1* | 2/2020 | Dreher | G06N 3/08 |
| 2020/0110803 A1* | 4/2020 | Djalali | G06F 16/24556 |
| 2021/0319186 A1* | 10/2021 | Djalali | G06F 40/242 |
| 2022/0004556 A1 | 1/2022 | Arnold | |
| 2022/0300525 A1 | 9/2022 | Talbot et al. | |

OTHER PUBLICATIONS

Djalali, Preinterview First Office Action, U.S. Appl. No. 16/166,125, dated May 5, 2020, 19 pgs.

Djalali, First Action Interview Office Action, U.S. Appl. No. 16/166,125, dated Sep. 9, 2020, 20 pgs.

Djalali, Quayle Office Action, U.S. Appl. No. 16/166,125, dated Mar. 3, 2021, 8 pgs.

Djalali_Notice-of-Allowance, U.S. Appl. No. 16/166,125, dated Mar. 17, 2021, 7 pgs.

Gao, Tong, et al. "Datatone: Managing ambiguity in natural language interfaces for data visualization." Proceedings of the 28th Annual ACM Symposium on User Interface Software & Technology. Nov. 2015, pp. 489-500. (Year: 2015).

Matsushita, Mitsunori, Eisaku Maeda, and Tsuneaki Kato. "An interactive visualization method of numerical data based on natural language requirements." International journal of human-computer studies 60.4, Apr. 2004, pp. 469-488. (Year: 2004).

Popescu, et al. "Towards a theory of natural language interfaces to databases." Proceedings of the 8th international conference on Intelligent user interfaces. Jan. 2003, pp. 149-157. (Year: 2003).

Sang Yun et al: "A phrase-driven grammar system for interactive data visualization," Proceedings of SPIE, vol. 6809, Jan. 27, 2008, p. 68090k, XP055650259, 1000 20th St. Bellingham WA 98225-6705 USA, ISBN: 978-1-5106-2687-4, 13 pgs.

Stolte et al., "Polaris: A system for query, analysis, and visualization of multidimensional relational databases," IEEE Transactions on Visualization and Computer Graphics 8, No. 1 (2002): 52-65-, (Year: 2002).

Tableau Software, Inc., International Search Report and Written Opinion, PCT/US2019/055169, dated Dec. 16, 2019, 12 pgs.

Tresor Mvumbi: "Natural Language Interface to Relational Database: A Simplified Customization Approach," Dissertation presented for the Degree of Master of Science in the Department of Computer Science, Aug. 2016, XP055650275, retrieved from htttps://open.uct.ac.za/bitstream/handle/11427/23058/thesis_sci_2016_mvumbi_tresor.pdf?sequece=1&iAllowed=y.

Vidya Setluer et al: "Eviza" User Interface Software and Technology, ACM, 2 Penn Plaza, Suite 701 New Yourk NY 10121-0701 USA, Oct. 16, 2016, pp. 365-377, XP058299767, DOI: 10.1145/2984511.2984588, ISBN: 978-1-4503-4189-9, 13 pgs.

Nhan, Office Action, U.S. Appl. No. 17/095,696, dated Jul. 8, 2021, 13 pgs.

Nhan, Notice of Allowance, U.S. Appl. No. 17/095,696, dated Apr. 20, 2022, 8 pgs.

Sleeper, Ryan (Practical Tableau, https://learning.oreilly.com/library/view/practical-tableau/9781491977309/, Apr. 2018) (Year: 2018).

Jou, Office Action, U.S. Appl. No. 17/501,928, dated Oct. 13, 2022, 6 pgs.

Nhan, Notice of Allowance, U.S. Appl. No. 17/887,361, dated Dec. 14, 2022, 7 pgs.

* cited by examiner

| Analytical Expressions 239 |
|---|
| Aggregation Expression 290 |
| Group Expression 292 |
| Filter Expression 294 |
| Limit Expression 296 |
| Sort Expression 298 |
| ⋮ |

Figure 2D

| Teams by Year | Sum of Wins | Count of Players |
|---|---|---|
| (Bulls, 1991) | 55 | 1 |
| (Heat, 2010) | 58 | 1 |
| (Heat, 2011) | 55 | 1 |

| By sum of wins by team by year | Sum of count of players |
|---|---|
| (55, (Bulls, 1991)), (55, (Heat, 2011)) | 2 |
| (58, (Heat, 2010)) | 1 |

| Figure | Natural Language Command | Intermediate Expression |
|---|---|---|
| 3C | Sum of wins by team | [sum of wins]_AggExp [by team]_GroupExp |
| 3E | Sum of wins by team over time | [sum of wins]_AggExp [by team]_GroupExp [over time]_GroupExp |
| 3F | Average wins, filter to heat | [Average wins]_AggExp [filter teams to "heat"]_FilterExp |
| 3G | wins by team by year with sum of count of players greater or equal to 1 | [[wins [by teams]_GroupExp [by year]_GroupExp]_DatasourceExp; [sum of [count of players]_AggExp]_AggExp is greater or equal to 1]_FilterExp |

Figure 5

Legend:

AggExp = Aggregation Expression

GroupExp = Group Expression

FilterExp = Filter Expression

USING NATURAL LANGUAGE CONSTRUCTS FOR DATA VISUALIZATIONS

RELATED APPLICATIONS

This application is a continuation of U.S. patent application Ser. No. 16/166,125, filed Oct. 21, 2018, titled "Determining Levels of Detail for Data Visualizations Using Natural Language Constructs," which claims priority to U.S. Provisional Patent Application No. 62/742,857, filed Oct. 8, 2018, titled "Inferencing Underspecified Natural Language Utterances in Visual Analysis," each of which is incorporated by reference herein in its entirety.

This application is related to U.S. patent application Ser. No. 16/134,892, filed Sep. 18, 2018, titled "Analyzing Natural Language Expressions in a Data Visualization User Interface," U.S. patent application Ser. No. 15/486,265, filed Apr. 12, 2017, titled, "Systems and Methods of Using Natural Language Processing for Visual Analysis of a Data Set," and U.S. patent application Ser. No. 14/801,750, filed Jul. 16, 2015, titled "Systems and Methods for using Multiple Aggregation Levels in a Single Data Visualization," each of which is incorporated by reference herein in its entirety.

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

Natural language interfaces are becoming a useful modality for data exploration. However, supporting natural language interactions with visual analytical systems is often challenging. For example, users tend to type utterances that are linguistically simple or colloquial, while the visual analytics system has more complicated nuances of realizing these utterances against the underlying data and analytical functions. While statistical and machine learning techniques can be employed, manually authoring and tuning a grammar for each new database is brittle and prohibitively expensive. In addition, to parse questions posed to a particular database, the statistical parser would need to be trained on a corpus of questions specific to that database.

SUMMARY

There is a need for improved systems and methods that support natural language interactions with visual analytical systems. The present disclosure describes an intermediate language that resolves natural language utterances to formal queries that can be executed against a visual analytics system (e.g., a data visualization application). The intermediate language further supports multiple aggregation levels in a single data visualization. Thus, the intermediate language reduces the cognitive burden on a user and produces a more efficient human-machine interface.

In accordance with some implementations, a method executes at a computing device having a display, one or more processors, and memory storing one or more programs configured for execution by the one or more processors. The method includes displaying a data visualization interface on the display. The method includes receiving user selection of a data source. The method further includes receiving user input to specify a natural language command directed to the data source. For example, the user input includes one or more words associated with the data source. The method further includes forming an intermediate expression according to a context-free grammar and a semantic model of data fields in the data source by parsing the natural language command, including identifying in the natural language command (i) a first term that specifies an aggregation type in a first aggregation, (ii) a second term that specifies a data field, in the semantic model, to be aggregated for the first aggregation, and (iii) one or more terms that specify data fields, in the semantic model, to determine grouping for the first aggregation. The computing device translates the intermediate expression into one or more database queries, including the first aggregation, according to the data source. The computing device executes the one or more database queries to retrieve one or more data sets from the data source, aggregated according to the first aggregation. The computing device generates and displays an updated data visualization of the retrieved data sets.

In some implementations, the translating includes using the intermediate expression recursively to create an updated data visualization having a different level of detail.

In some implementations, parsing the natural language command comprises parsing the natural language command into a plurality of tokens.

In some implementations, for each of the plurality of the tokens, the computing device looks up the respective token in a lexicon to identify a concept corresponding to the respective token.

In some implementations, the natural language command includes a plurality of words. Parsing the natural language command further comprises determining a function for each of the plurality of words within the context of the natural language command using the lexicon. Each of the plurality of tokens includes either a single word or a phrase that is formed by combining two or more adjacent words in the natural language command.

In some implementations, forming the intermediate expression comprises concatenating the concepts corresponding to the tokens.

In some implementations, looking up each token in the lexicon to identify a concept corresponding to the respective token further comprises identifying one or more tokens that do not have corresponding concepts, and forming the intermediate expression using the plurality of tokens that do have corresponding concepts.

In some implementations, the lexicon includes a data source lexicon and a grammar lexicon.

In some implementations, the data source lexicon includes a plurality of fields corresponding to the data fields in the data source. Each of the plurality of fields is mapped to one or more entries. Each of the entries corresponds to a concept.

In some implementations, the data source lexicon is generated from the semantic model of the data source. The semantic model comprises names of attributes, values of the attributes, and metadata corresponding to the values.

In some implementations, the plurality of fields in the data source lexicon includes a plurality of synonyms.

In some implementations, the plurality of synonyms includes a first subset that is defined by the user.

In some implementations, the plurality of synonyms includes a second subset that is predefined by the computing device.

In some implementations, forming the intermediate expression uses one or more predefined grammar rules governing the context-free grammar.

In some implementations, the predefined grammar rules include a pluirality of grammar rules whose expression types are: limiting, group, aggregation, filtering, or sort.

In some implementations, receiving user input to specify the natural language command comprises receiving the user input via a user-interface control in the data visualization interface.

In some implementations, the method further comprises receiving user selection of a plurality of data sources, each associated with a data source lexicon that is specific to the data source.

In some implementations, the data sources share a common grammar lexicon.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 2D is a block diagram illustrating analytical expressions according to some implementations.

FIG. 5 is a table illustrating intermediate expressions for the natural language commands of FIGS. 3C, 3E, 3F, and 3G according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The various methods and devices described in the present specification improve the effectiveness of natural language interfaces on data visualization platforms by using a lightweight, intermediate language to represent an intermediate logical query generated from a natural language expression (also known as a natural language input, query, or utterance). The intermediate language, also referred to herein as ArkLang, is designed to resolve natural language inputs into formal queries that can be executed against a database. A natural language input is lexically translated into ArkLang. An intermediate expression of the input is formed in ArkLang and is then translated (e.g., compiled) into a series of instructions employing a visualization query language to issue a query against a data source (e.g., database). The data visualization platform automatically generates and displays a data visualization (or an updated data visualization) of retrieved data sets in response to the natural language input. The visualization query language is a formal language for describing visual representations of data, such as tables, charts, graphs, maps, time series, and tables of visualizations. These different types of visual representations are unified into one framework, coupling query, analysis, and visualization. Thus, the visualization query language facilitates transformation from one visual representation to another (e.g., from a list view to a cross-tab to a chart).

Figure 1:
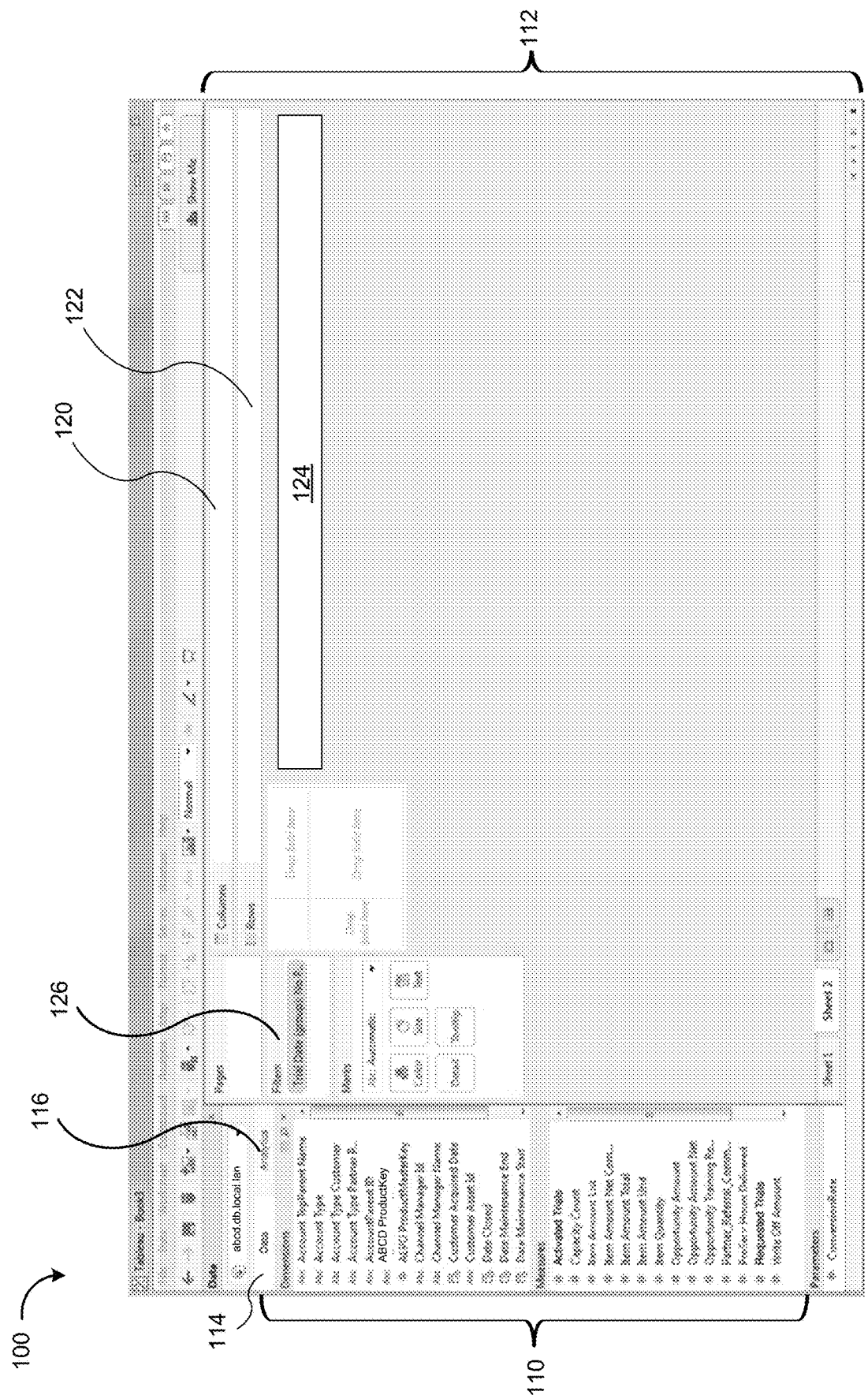
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language box 124) to further explore the displayed data visualization. In some instances, a user creates the initial association using the natural language input box 124, which results in one or more data elements being placed in the column shelf 120 and the row shelf 122. For example, the user may provide a command to create a relationship between data element X and data element Y. In response to receiving the command, the column shelf 120 and the row shelf 122 may be populated with the data elements (e.g., the column shelf 120 may be populated with data element X and the row shelf 122 may be populated with data element Y, or vice versa).

Figure 2A:
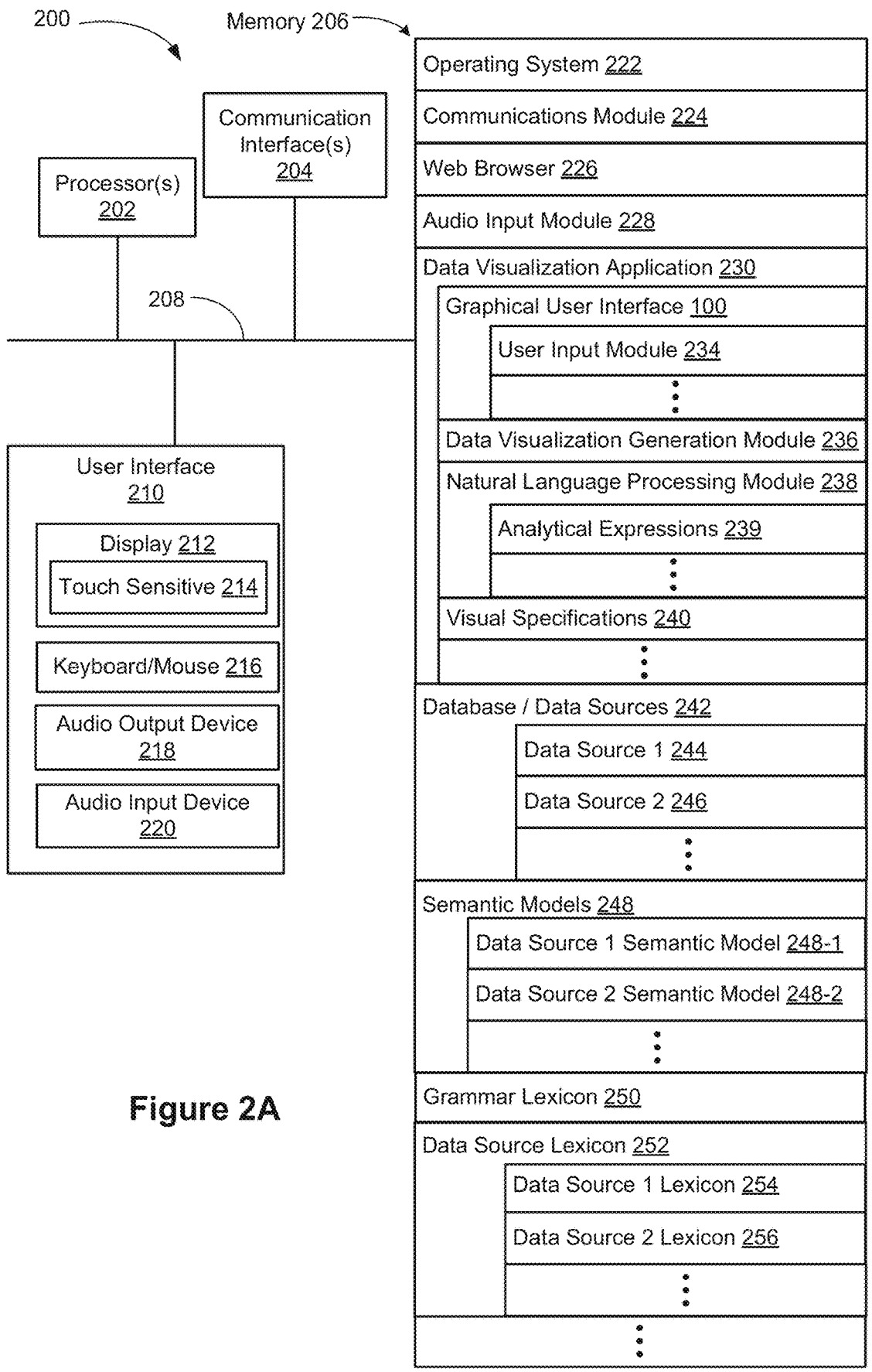
FIG. 2A is a block diagram of a computing device according to some implementations.

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. In some implementations, the data visualization application 230 also includes:
  - a graphical user interface 100 for a user to construct visual graphics. In some implementations, the graphical user interface includes a user input module 234 for receiving user input through the natural language box 124 (FIG. 1). For example, a user inputs a natural language command or expression into the natural language box 124 identifying one or more data sources 242 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generation module 236, which automatically generates and displays a corresponding visual graphic (also referred to as a "data visualization" or a "data viz") using the user input (e.g., the natural language input);
  - a natural language processing module 238 for processing (e.g., interpreting) natural language inputs (e.g., commands) received using the natural language box 124. In some implementations, the natural language processing module 238 parses the natural language command (e.g., into tokens) and translates the command into an intermediate language (e.g., ArkLang).

The natural language processing module 238 includes analytical expressions 239 that are used by natural language processing module 238 to form intermediate expressions of the natural language command. The natural language processing module 238 also translates (e.g., compiles) the intermediate expressions into database queries by employing a visualization query language to issue the queries against a database or data source 242 and to retrieve one or more data sets from the database or data source 242;

visual specifications 240, which are used to define characteristics of a desired data visualization. In some implementations, the information the user provides (e.g., user input) is stored as a visual specification. In some implementations, the visual specifications 240 includes previous natural language commands received from a user or properties specified by the user through natural language commands. In some implementations, the visual specification 240 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," which is incorporated by reference herein in its entirety;

zero or more databases or data sources 242 (e.g., a first data source 244 and a second data source 246), which are used by the data visualization application 230. In some implementations, the data sources are stored as spreadsheet files, CSV files, XML files, flat files, or JSON files, or stored in a relational database. For example, a user selects one or more databases or data sources 242 (which may be stored on the computing device 200 or stored remotely), selects data fields from the data source(s), and uses the selected fields to define a visual graphic;

zero or more semantic models 248 (e.g., a first semantic model 248-1 and a second semantic model 248-2), each of which is derived directly from a respective database or data source 242. The semantic model 248 represents the database schema and contains metadata about attributes. In some implementations, the semantic model 248 also includes metadata of alternative labels or synonyms of the attributes. The semantic model 248 includes data types (e.g., "text," "date," "geospatial," "Boolean," and "numeric"), attributes, (e.g., a currency type such as the United States Dollar), and a semantic role (e.g., "City" role for a geospatial attribute) for data fields of the respective database or data source 242. In some implementations, the semantic model 248 also captures statistical values (e.g., data distribution, range limits, average, and cardinality) for each attribute. In some implementations, the semantic model 248 is augmented with a grammar lexicon 250 that contains a set of analytical concepts 258 found in many query languages (e.g., average, filter, sort). In some implementations, the semantic model 248 also distinguishes between attributes that are measures (e.g., attributes that can be measured, aggregated, or used for mathematical operations) and dimensions (e.g., fields that cannot be aggregated except as count). Thus, the semantic model 248 helps with inferencing and choosing salient attributes and values;

a grammar lexicon 250, which includes analytical concepts 258 (see FIG. 2B) that are used to support the analytical expressions 239 for forming intermediate expressions; and zero or more data source lexicons 252 (e.g., a first data source lexicon 254 and second data source lexicon 256), each of which is associated with a respective database or data source 242. Details of the components of a data source lexicon are described in FIG. 2B.

Figure 2B:
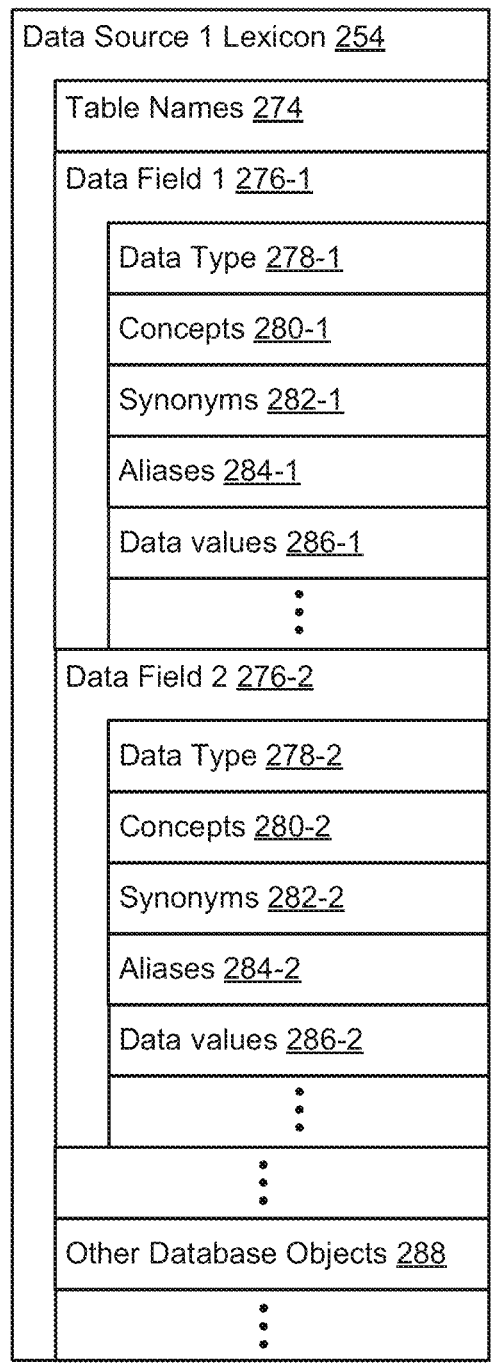
FIG. 2B is a block diagram illustrating components of a data source lexicon according to some implementations.

FIG. 2B is a block diagram illustrating components of a first data source lexicon 254, in accordance with some implementations. The first data source lexicon 254 includes table names 274 corresponding to names of one or more tables of the first data source 244, a plurality of data fields 276 of the first data source 244, and other database objects 288. Each data field 276 includes:

a data type 278, such as integer, string, date, or floating point numeric;

One or more concepts 280 that are used to interpret the data field. For example, a data field "Michael" may be interpreted using the concepts such as a "string," "name," "gender (e.g., male)," "singer," "basketball player," and/or "chef" In some implementations, the one or more concepts are derived from elastic searches;

One or more synonyms 282, which are defined by the system. For example, a data field "average" may include synonyms such as "mean" and "avg";

One or more aliases 284, which are defined by the user. For example, a data field "goods" may include aliases such as "widgets," "bananas," and "my favorite field"; and data values 286 (e.g., for low cardinality string fields).

In some implementations, the data source lexicon 254 includes other database objects 288 as well.

Figure 2C:
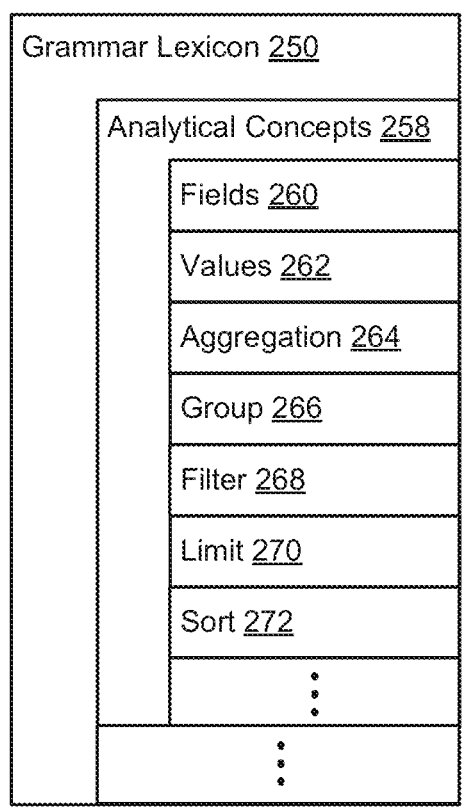
FIG. 2C is a block diagram illustrating sub-modules of a grammar lexicon according to some implementations.

FIG. 2C is a block diagram illustrating components of the grammar lexicon 250 according to some implementations. In some implementations, the grammar lexicon comprises analytical concepts 258 that support the formation of analytical expressions 239.

The analytical concepts 258 include:

a field 260 concept, which is a finite set of database attributes. Examples of field concepts include "sales," and "product category";

a value 262 concept, which is a finite set of database values. Examples of value concepts include "$100" and "Avery Leckman";

an aggregation 264 concept, which is a finite set of operators where the values of multiple rows are grouped together to form a single value based on a mathematical operation. Examples of aggregation concepts include "average," "median," "count," "distinct count";

a group 266 concept, which is a finite set of operators that partitions the data into categories shown in a data visualization. An example of a group concept includes "by" a field;

a filter 268 concept, which is a finite set of operators that returns a subset of the field's domain. Examples of filter concepts "filter to," "at least," "between," "at most";

a limit 270 concept, which is a finite set of operators (akin to the filters 268) that returns a subset of the field's domain, restricting up to n rows, where $1 \leq n \leq N$, and N is the total number of rows in the domain. Examples of limit concepts include "top" and "bottom"; and a sort 272 concept, which is a finite set of operators that arranges data rows in an order. Examples of sort concepts include "ascending," "descending," and "alphabetical."

ArkLang can be generated from a set of semantic models (e.g., the semantic model 248) representing their corresponding database, a context-free grammar (CFG), and a set of semantic constraints. In some implementations, a dialect of ArkLang is a set of all syntactically valid and semantically meaningful analytical expressions that can be generated by fixing a particular semantic model and leveraging the context-free grammar and a fixed set of semantic heuristics.

In some implementations, canonical representations are assigned to the analytical expressions 239 (e.g., by the natural language processing module 238) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions.

FIG. 2D is a block diagram illustrating analytical expressions 239 of the natural language processing module 238, in accordance with some implementations. The analytical expressions along with their canonical forms in the dialect of ArkLang include:

aggregation expressions 290: these are in the canonical form [agg att], where agg∈Aggregations and att is an Attribute. An example of an aggregation expression is "average Sales" where "average" is agg and "Sales" is att;

group expressions 292: these are in the canonical form [grp att], where grp∈Groups and att is an attribute. An example of a group expression is "by Region" where "by" is grp and "Region" is att;

filter expressions 294: these are in the canonical form [att filter val], where att is an attribute, filter∈Filters, and val∈Values. An example of a filter expression is "Customer Name starts with John" where "Customer" is att, "starts with" is filter, and "John" is val;

limit expressions 296: these are in the canonical form [limit val ge ae], where limit∈Limits, val∈Values, ge∈group expressions, and ae∈aggregation expressions. An example of a limit expression is "top 5 Wineries by sum of Sales" where "top" is limit, "5" is val, "Wineries" is the attribute to group by, and "sum of Sales" is the aggregation expression; and sort expressions 298: these are in the canonical form [sort ge ae], where sort∈Sorts, ge∈group expressions, and ae∈aggregation expressions. An example of a sort expression is "sort Products in ascending order by sum of Profit" where "ascending order" is the sort, "Products" is the attribute to group by, and "sum of Profit" is the aggregation expression.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these submodules are described in U.S. patent application Ser. No. 16/134,892, titled "Analyzing Natural Language Expressions in a Data Visualization User Interface, filed Sep. 18, 2018, which is incorporated by reference herein in its entirety;

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIGS. 3A-3J illustrate example data sources as well as the automatic generation and display of visual representations in response to natural language commands entered by a user, using the intermediate language as the backdrop. Further details about the command processing using the intermediate language are explained in FIG. 4.

Figure 3A:
FIGS. 3A-3J illustrate the use of the intermediate language to support multiple levels of aggregation according to some implementations.

FIG. 3A illustrates an exemplary data source 310 (e.g., the database or data source 242 in FIG. 2A) describing players on basketball teams for respective years, and the number of wins by the team for the respective years. In this example, the data source 310 is a data structure (e.g., a spreadsheet) that includes a plurality of data values stored in data columns. In some implementations, the data source 310 is a raw (e.g., original or unformatted) data source. In this example, the data source fields are un-aggregated (other than the Wins column). In some implementations, analytical expressions (e.g., the analytical expressions 239) that reference un-aggregated data source fields are computed for each row in the underlying table. In other words, the dimensionality of the expression is at the row level and is known as a "Level of Detail (LOD) 0."

Figure 3B:
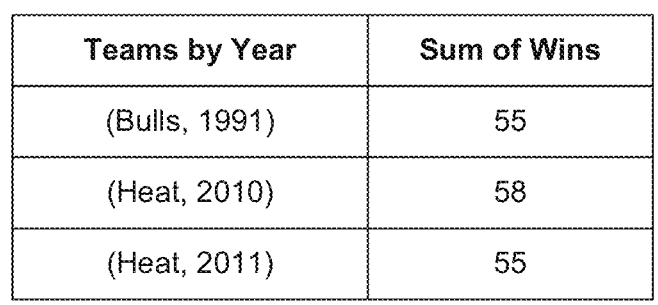

FIG. 3B shows an aggregated data source 320 that is generated from the original data source 310. The aggregated data source 320 includes an aggregated data column "Teams by Year." The fields in the aggregated data source 320 are derived by aggregating (e.g., grouping) fields for team and year for each row. The dimensionality of the aggregated data source 320 is "Level of Detail (LOD) 1." In other words, LOD 1 represents a single level of aggregation, and the aggregated data source 320 is a table derived from the row-level data.

Figure 3C:
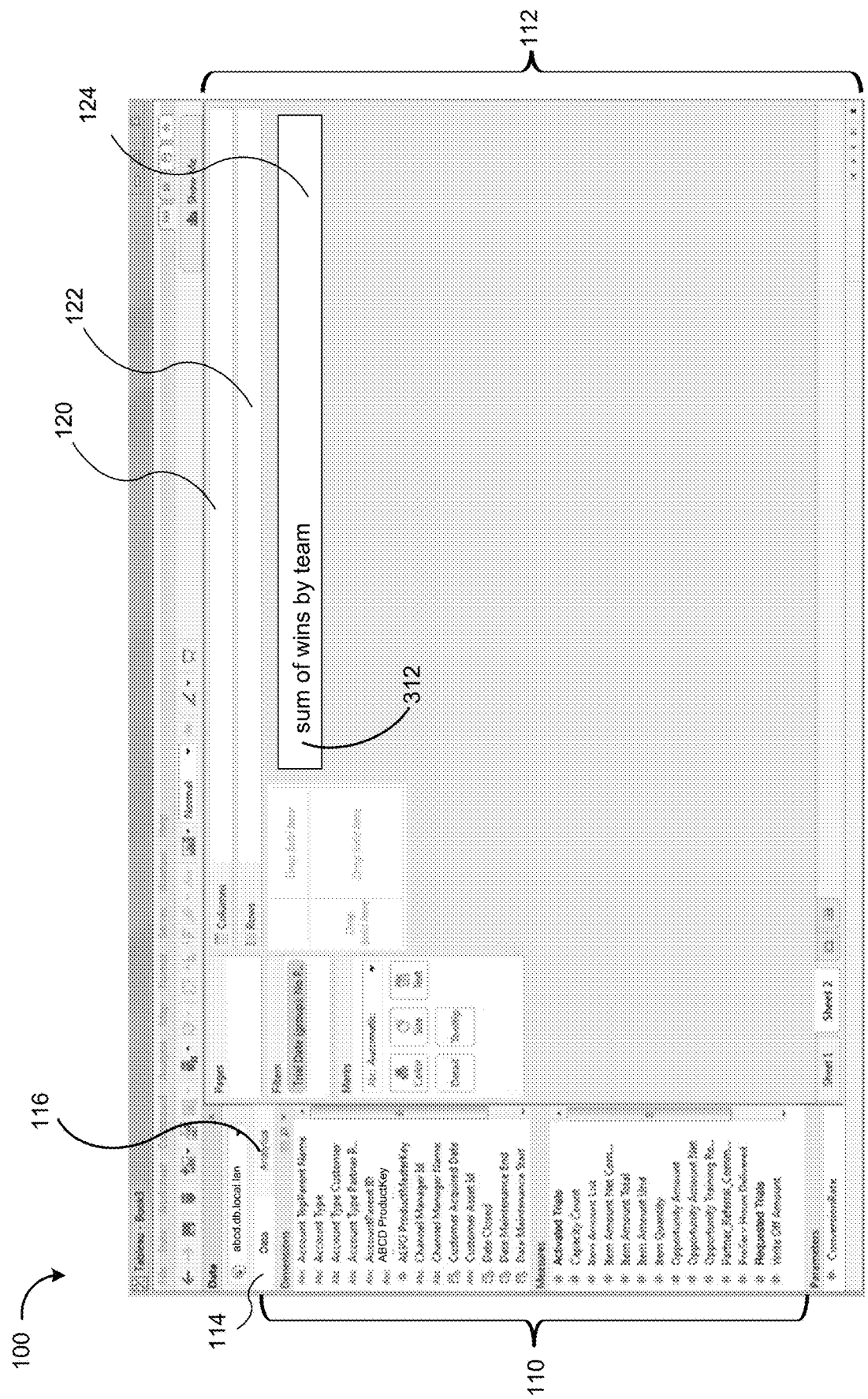

FIG. 3C illustrates a user interaction with the graphical user interface 100. In this example, the user enters a natural language expression (e.g., a natural language command) 312 "sum of wins by team" in the command box 124. Typically, the natural language expression includes one or more terms that identify data fields from a data source (e.g., the data source 310). A term may be a dimension (e.g., categorical data) or a measure (e.g., a numerical quantity). As illustrated by the example, the natural language input typically includes more than one term.

Figure 3D:
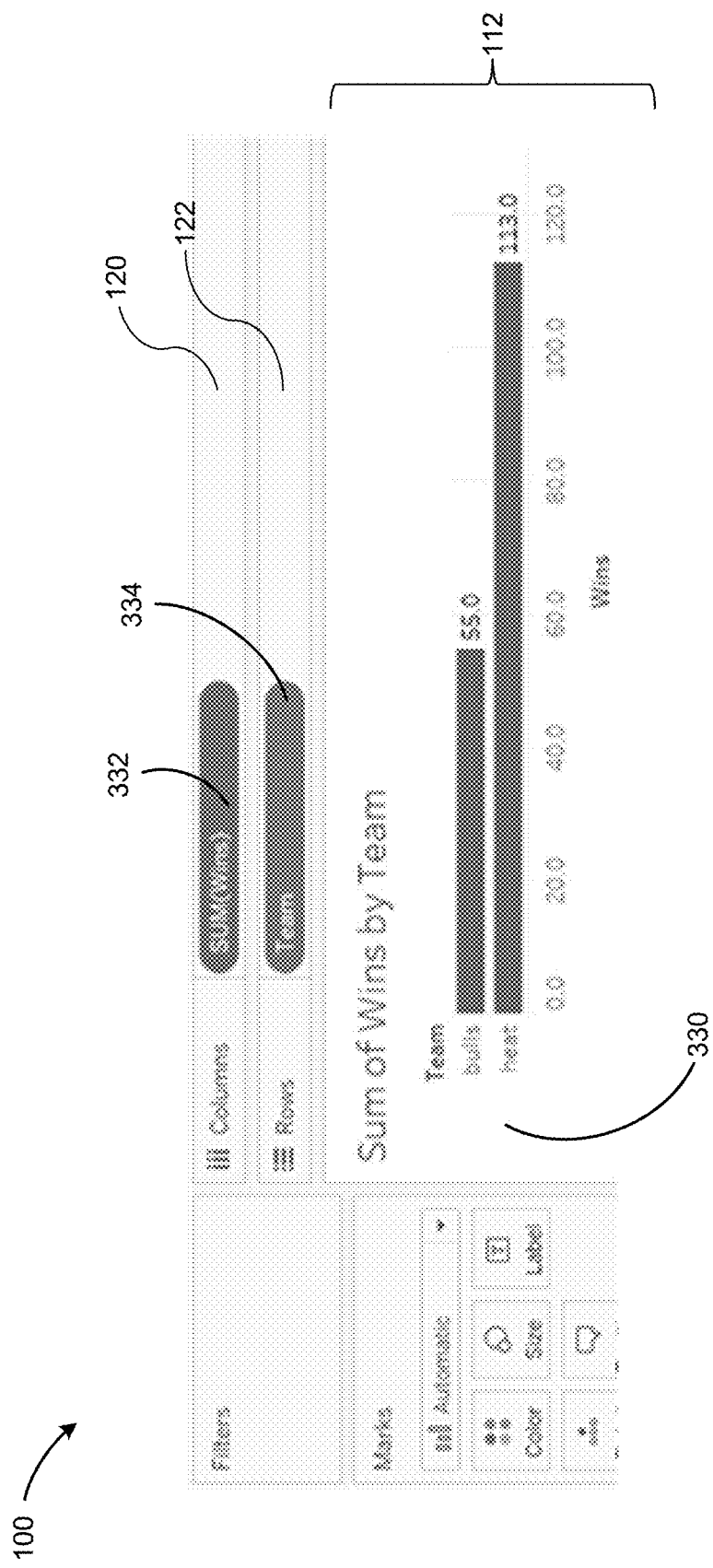

FIG. 3D illustrates a data visualization 330 (e.g., a horizontal bar graph) that is automatically generated and displayed in the graphical user interface 100 in response to the natural language expression 312 entered by the user. The column shelf 120 and the row shelf 122 include, respectively, automatically generated fields "SUM(Wins)" 332 and "Team" 334. In other words, the data visualization 330 is a visual representation of an aggregation ("sum") of a measured value (number of "wins") on one axis (e.g., x-axis) and the dimension ("Team") on the other axis (e.g., y-axis). In this instance, the dimensionality associated with the data visualization 330 is Level of Detail (LOD) 1.

Figure 3E:
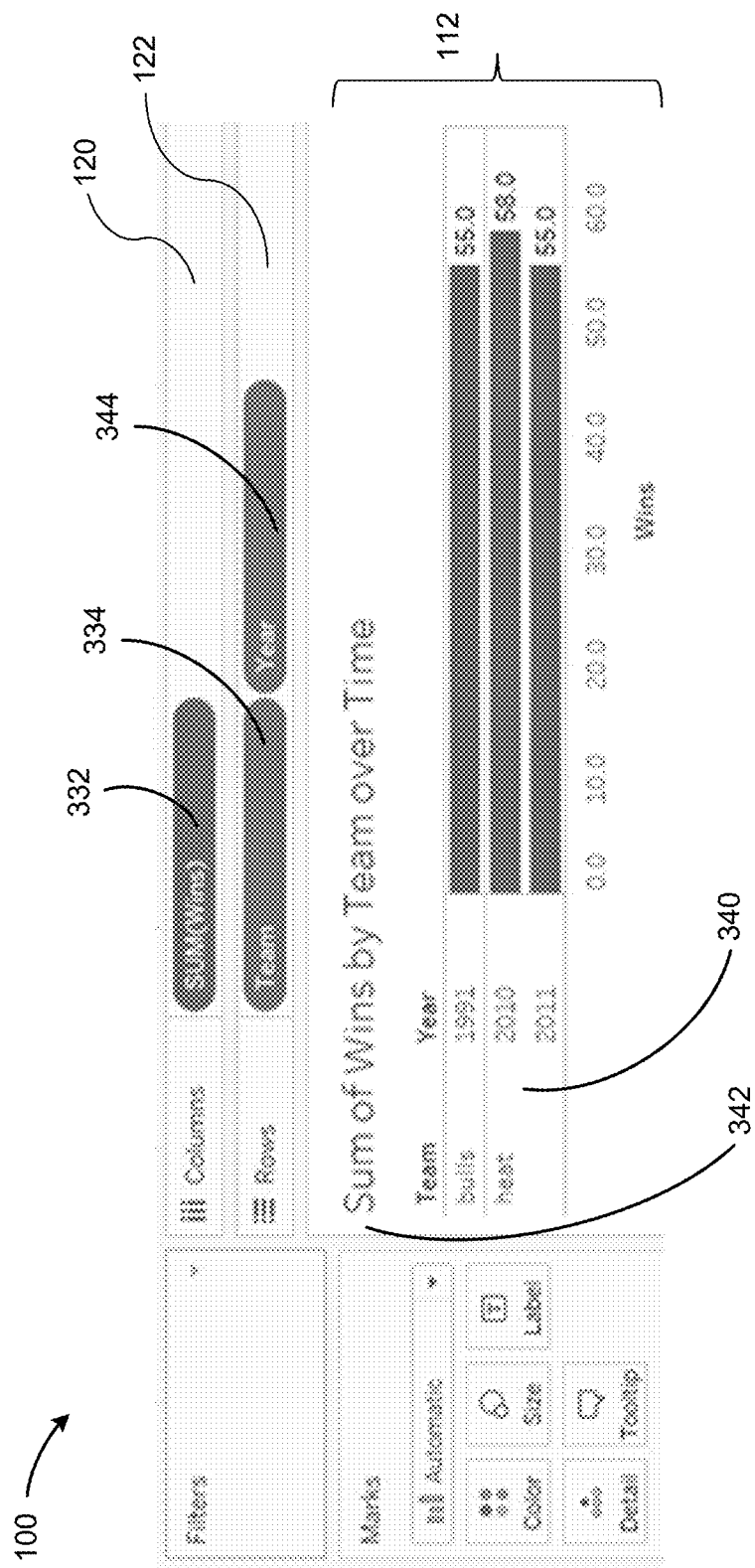

FIG. 3E illustrates a data visualization 340 (e.g., a horizontal bar graph) that is automatically generated in response to the natural language expression 342 "Sum of wins by team over time." A comparison between FIG. 3D and FIG. 3E shows that the field in the column shelf 120 is the same in both cases (SUM(Wins) 332), whereas the row shelf 122 of FIG. 3E includes fields "Team" 334 and "Year" 344 (i.e., it includes one additional field "Year"). The data visualization 340 differs from FIG. 3D in that the y-axis includes the dimensions "Team" and "Year," and shows the breakdown of the sum of wins by team for year. The dimensionality associated with the data visualization 340 is Level of Detail (LOD) 1.

Figure 3F:
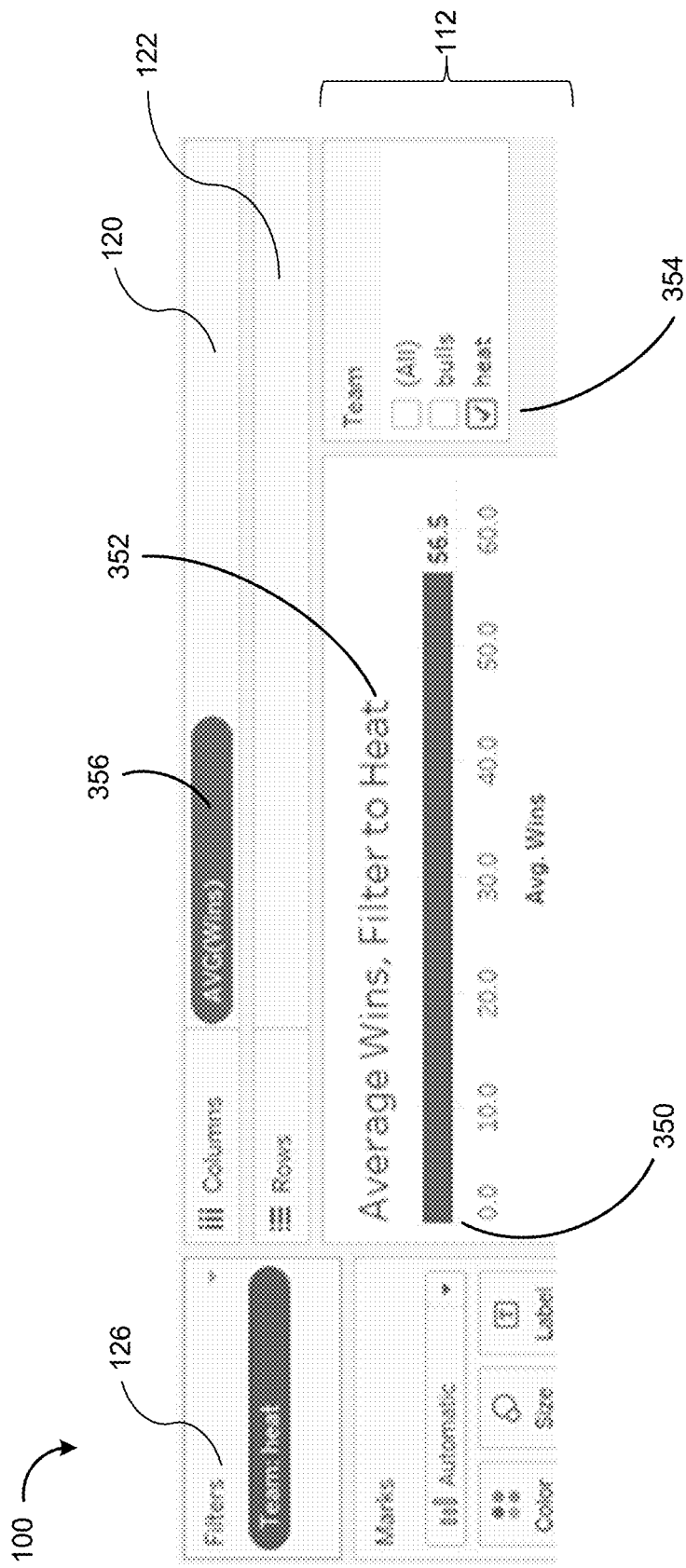

FIG. 3F illustrates a data visualization 350 (e.g., a horizontal bar graph) that is automatically generated in response to the natural language expression "Average wins filter teams to heat" 352. The column shelf 120 includes the automatically generated field "AVG(Wins)" 356. Additionally, the filter region 126 shows the inclusion of a filter for "Team: heat." The data visualization 350 depicts an aggregation ("average") of a measured value (number of "wins") on one axis (e.g., the x-axis). The y-axis shows a single horizontal bar corresponding to the filtered team "heat." In some implementations, the data visualization region 112 also displays a window 354 that allows the user to manually select which team they like to filter. Further details of data visualization filters are described in U.S. patent application Ser. No. 14/801,750 titled "Systems and Methods for using Multiple Aggregation Levels in a Single Data Visualization," filed Jul. 16, 2015, which is incorporated by reference herein in its entirety.

The data visualization in FIG. 3F shows computing a team average by looking at the number of wins for each year. If the "raw" data source includes the data fields Team, Year, and Wins, then this average represents an LOD 1 because it can be computed using a single aggregation (e.g., analogous to computing SELECT Team, AVERAGE(Wins) FROM Data Source GROUP BY Team). On the other hand, if the raw data source is individual games played, then computing the average by year is an LOD 2 calculation because there is a first aggregation to get yearly totals for each team (which is the LOD 1 calculation) and the second aggregation is based on the first aggregation. For example, if the raw data source has the fields Team, Gate_Date, and Winner (a Boolean field), computing the first aggregation is analogous to computing SELECT Team, YEAR(Game_Date) AS Year, COUNT(*) AS Wins FROM Games WHERE Winner=1 GROPUP BY Team, YEAR(Game_Date).

Figure 3G:
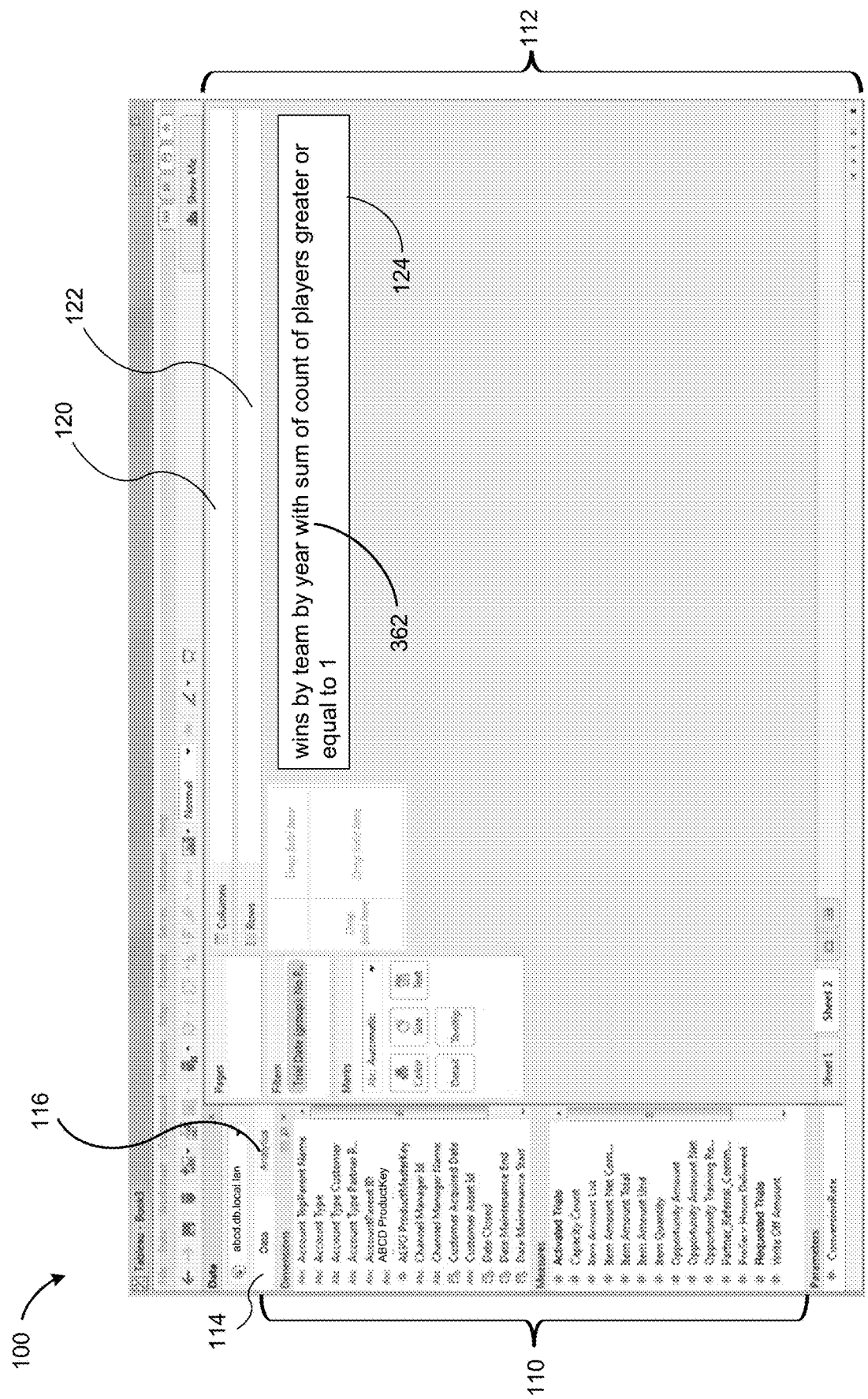

FIG. 3G illustrates a natural language expression 362 "Wins by team by year with sum of count of players greater or equal to 1" that is entered by a user on the graphical user interface 100.

Figure 3H:
Figure 3I:

In some implementations, a second aggregation (e.g., a Level of Detail (LOD) 2) can be derived from a LOD 1 table. FIG. 3H shows an aggregated data source 360 with level of detail (LOD) 1 that is generated from the original data source 310 of FIG. 3A. The data source 360 includes a data column "Teams by Year" and aggregated columns for "Sum of wins" and "Count of players." FIG. 3I hows an aggregated data source 370 that is derived (e.g., generated) from the aggregated data source 360 and includes a twice-aggregated data column "By sum of wins by team by year." That is to say, the data columns "Team by Year" and "Sum of Wins" are first aggregated to form data fields "(55, (Bulls, 1991))," "(58, (Heat, 2010))," and "(55, (Heat, 2011))." Since there is one player for each team by year, and there are two (Team, Year) with 55 wins, the count of players with 55 wins for (Team, Year) is 2. Accordingly, the data fields are aggregated again (e.g., by summing the count of players with 55 wins) to form the data source 370 of FIG. 3I. Thus, the aggregated data source 370 has a second level of detail (LOD 2), and includes a twice-aggregated data column "By sum of wins by team by year." In some implementations, multiple aggregations (e.g., LOD 2) are achieved using table calculations and LOD calculations.

Figure 3J:
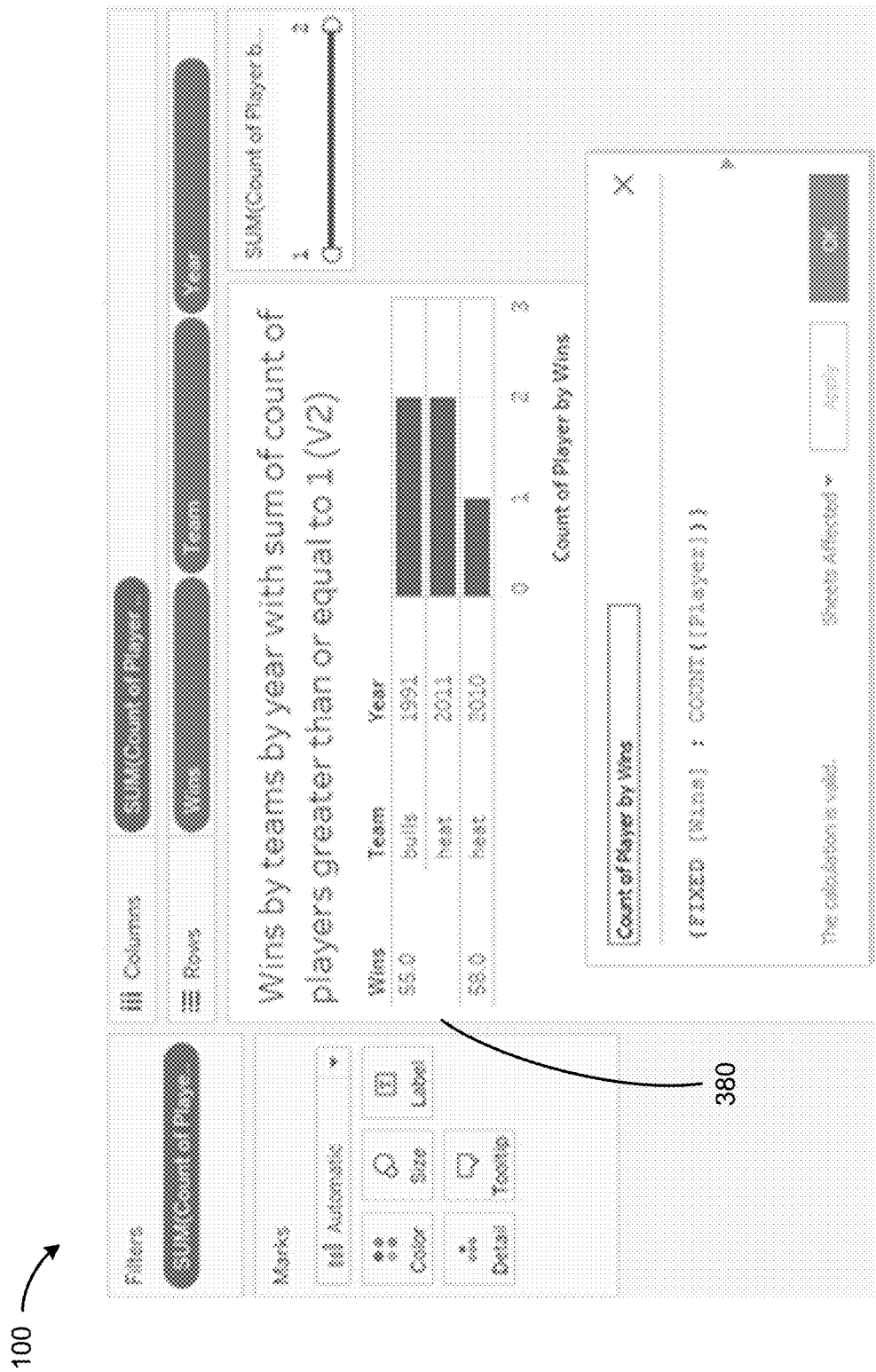
Figure 4A:
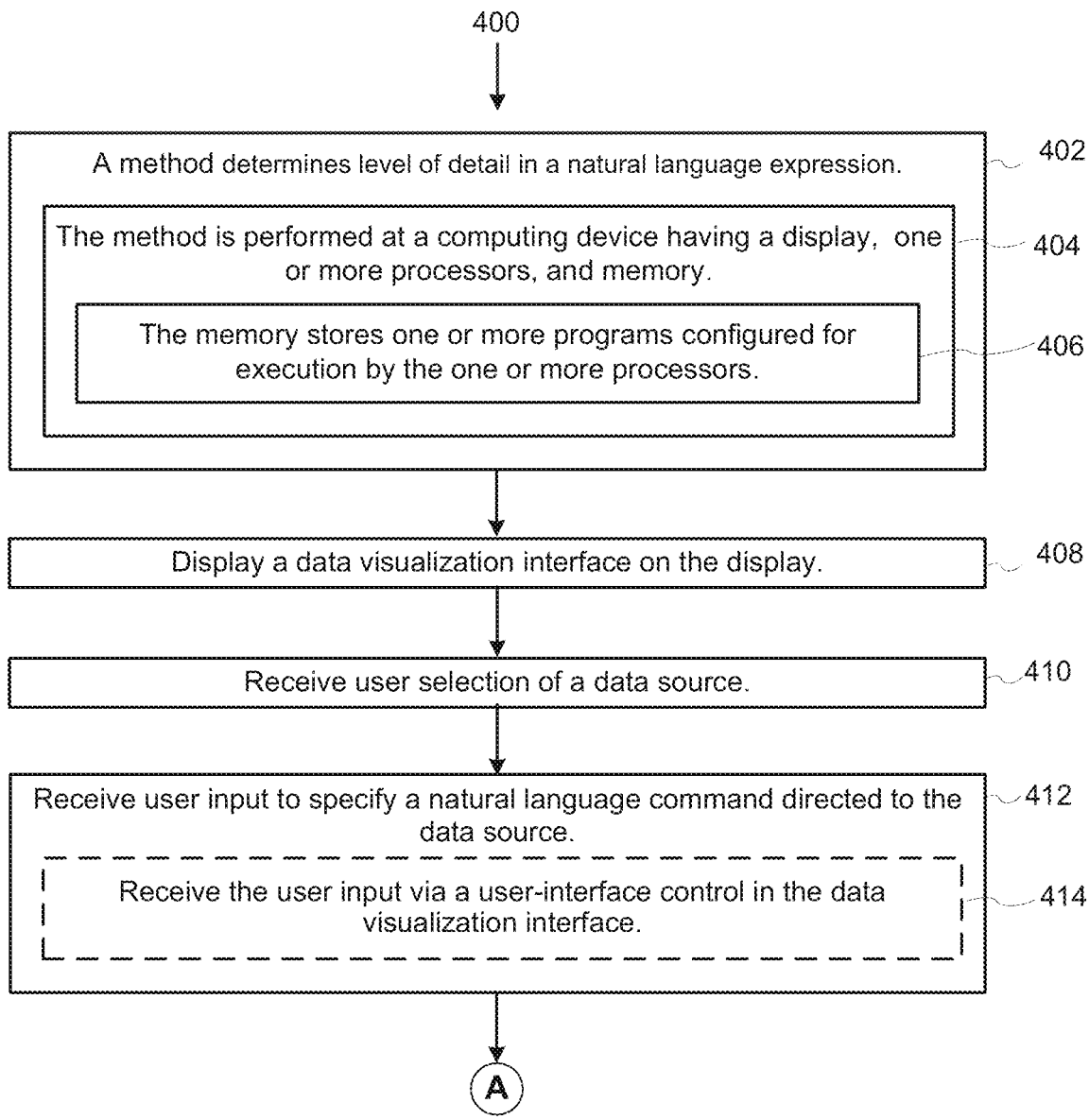
FIGS. 4A-4D provide a flowchart of a method for determining level of detail in a natural language expression in accordance with some implementations.
Figure 4B:
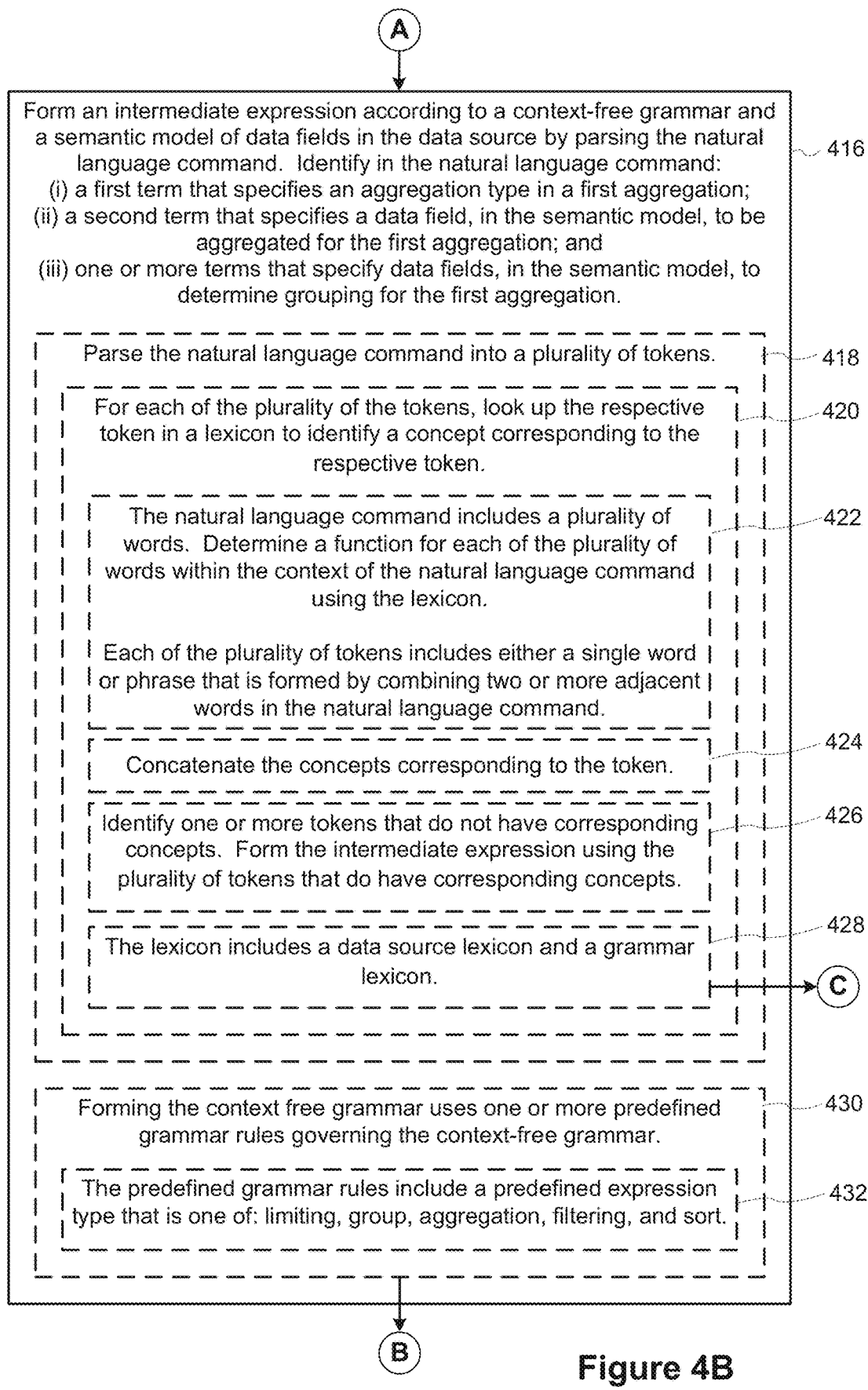
Figure 4C:
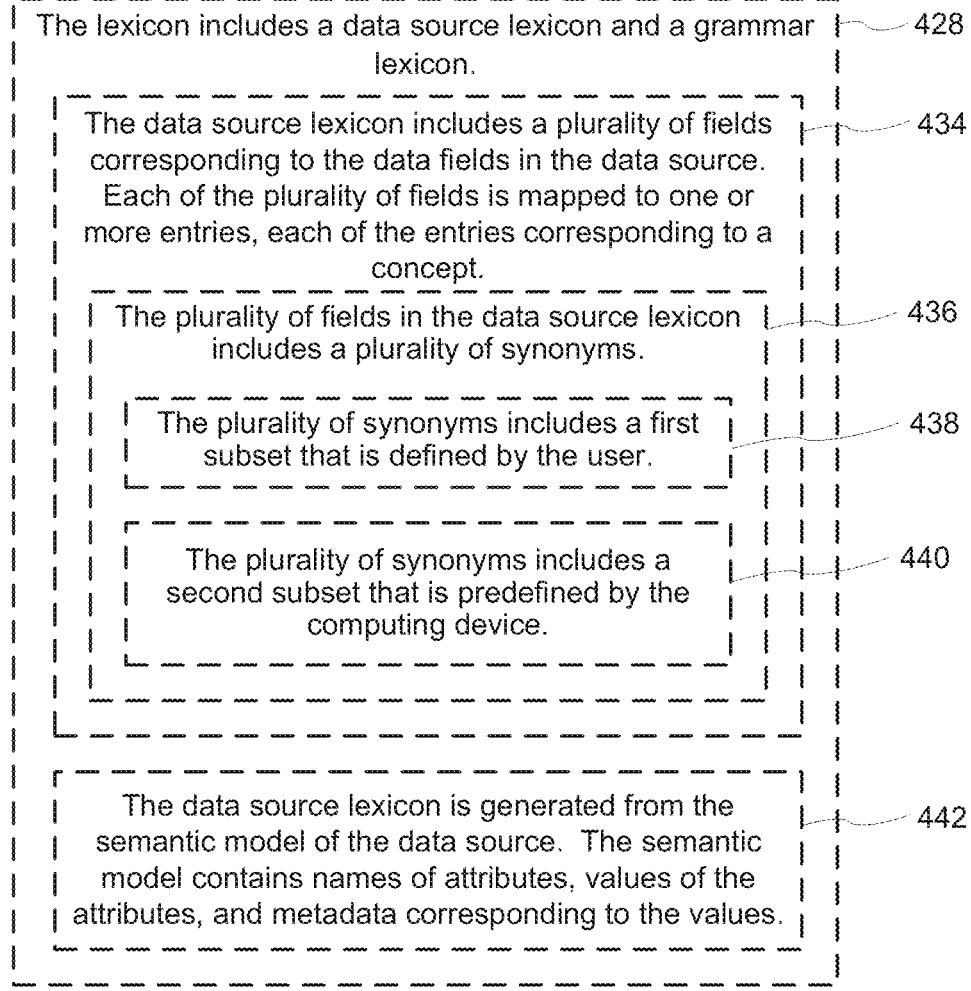
Figure 4D:
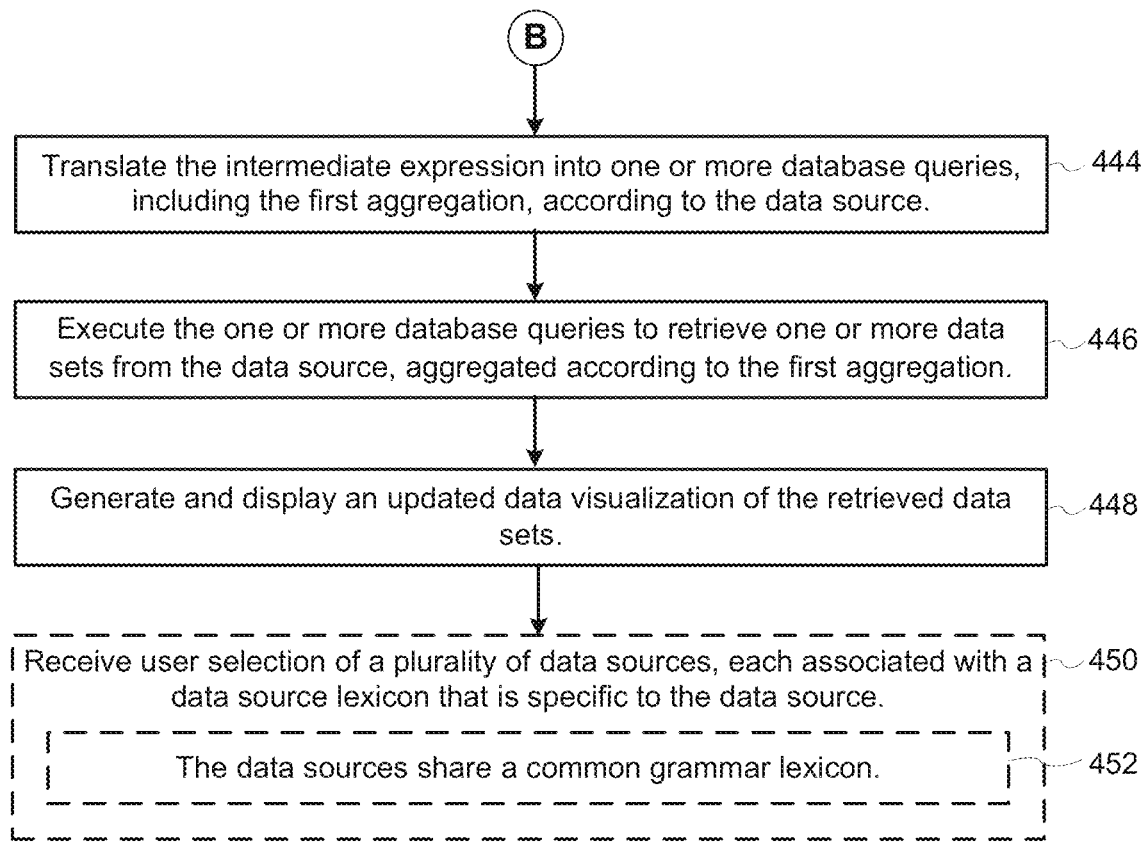

FIG. 3J illustrates a data visualization 380 that is automatically generated and displayed in response to the natural language expression 362, and is the visual representation of the data source 370.

FIGS. 4A-4D provide a flowchart of a method 400 for determining (402) level of detail in a natural language expression in accordance with some implementations. The method 400 is also called a process.

In some implementations, an intermediate language (also referred to as ArkLang) facilitates the process of issuing natural language queries to a generic database. In some implementations, the translation from a natural language input to visualization query language (VizQL) commands for generating a visualization response uses the following algorithm:

Input: a sequence of natural language tokens

Output: VizQL query expression(s)

Let f be a translation function that maps each natural language word into an ArkLang concept (e.g., the concept "average");

Let g be (a top-down recursive) translation function mapping analytical expressions of ArkLang to VizQL;

Then h is defined as the composition off and g mapping a natural language expression into VizQL;

Perform a lexical translation from natural language into ArkLang. For example, f (mean)=f (avg)="average" and f (wine prices)="Price";

Leverage the context free grammar and a set of grammar rules to parse the resultant translated terms into ArkLang dialect. For example, "average"∈Aggregations and wine prices∈Fields, so [average, Price]∈aggregation expressions; and Compile the ArkLang sentences into VizQL commands and issue those commands against a database. For example, perform the translation g([average, Price]).

The method 400 is performed (404) at a computing device 200 that has (404) a display 212, one or more processors 202, and memory 206. The memory 206 stores (406) one or more programs configured for execution by the one or more processors 202. In some implementations, the operations shown in FIGS. 4A-4D correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 400 may be combined and/or the order of some operations may be changed.

The computing device 200 displays (408) a data visualization interface 100 on the display 212.

The computing device 200 receives (410) user selection of a data source. For example, the computing device receives user selection of the data source 310 as illustrated in FIG. 3A.

The computing device receives (412) user input to specify a natural language command directed to the data source (e.g., the database or data sources 242 or the data source 310). In some implementations, the user input includes one or more fields associated with the data source. For instance, the user input comprises a plurality of words and/or numerals.

In some implementations, the computing device 200 receives the user input via (414) a user-interface control in the data visualization interface. For example, the computing device receives the user input via the command box 124 of the graphical user interface 100. In some implementations, the user may enter (e.g., type in) the user input. In some implementations, the user input is a voice utterance captured by the audio input device 220.

The computing device forms (416) an intermediate expression (e.g., using the natural language processing module 238) according to a context-free grammar and a semantic model 248 of data fields in the data source by parsing the natural language command, including identifying in the natural language command (i) a first term that specifies an aggregation type in a first aggregation, (ii) a second term that specifies a data field, in the semantic model 248, to be aggregated for the first aggregation, and (iii) one or more terms that specify data fields, in the semantic model, to determine grouping for the first aggregation.

In some implementations, a parsing algorithm Cocke-Kasami-Younger (CKY) is used for parsing the natural language command. The CKY algorithm employs bottom-up parsing and dynamic programming on a context-free grammar. The input to the underlying CKY parser is this context-free grammar with production rules augmented with both syntactic and semantic predicates based on analytical expressions that correspond to basic database operations found in the database query's underlying analytical functionality.

In some implementations, parsing the natural language command comprises parsing (418) the natural language command into a plurality of tokens. Referring to the example of FIG. 3C, the natural language command 312 comprises a string of words "sum of wins by team." In some implementations, each of the tokens is a word in the string of words. For example, the natural language processing module 238 parses the command 312 into five tokens "sum", "of", "wins", "by", and "team".

In some implementations, for each of the plurality of tokens, the computing device 200 looks up (420) the respective token in a lexicon to identify a concept corresponding to the respective token. In the example of FIG. 3, the computing device 200 looks up a grammar lexicon 250 and a data source lexicon 252 corresponding to the data source 310 to identify a concept corresponding to the respective token. For instance, the tokens "wins" and "team" correspond to fields in the data source and therefore their concepts are likely to be identified in the data source lexicon. On the other hand, the tokens "sum" and "of" are associated with the aggregation 264 concept and the group 266 concept defined in the grammar lexicon 250.

In some implementations, the natural language command includes (422) a plurality of words. The computing device 200 determines a function for each of the plurality of words within the context of the natural language command using the lexicon. Each of the plurality of tokens includes either a single word or a phrase that is formed by combining two or more adjacent words in the natural language command.

As described above, the natural language command of FIG. 3C has been parsed into five tokens. In some implementations, the computing device 200 determines that one or more of the tokens (e.g., "of" and "by") are not meaningful on their own. In this instance, the computing device 200 forms one or more new tokens by combining a token that is not functionally meaningful with its immediately preceding or immediately succeeding word (e.g., token), to yield respective phrases. In this example, the computing device forms new tokens/phrases "sum of", "of wins", "wins by" and "by team." The computing device 200 may again determine that the first two phrases are not functionally meaningful and thus combines the words that immediately precede and succeed "by" to form the phrase "sum by wins."

In some implementations, forming the intermediate expression comprises concatenating (424) the concepts corresponding to the tokens. Table 5 shows a table 500 illustrating intermediate expressions for the natural language commands of FIGS. 3C, 3E, 3F, and 3G according to some implementations (e.g., generated by the natural language processing module 238).

In some implementations, the computing device 200 identifies (426) one or more tokens that do not have corresponding concepts, and forms the intermediate expression using the plurality of tokens that do have corresponding concepts. In other words, the one or more identified tokens are excluded (i.e., not used) to form the intermediate expression.

In some implementations, the lexicon includes (428) a data source lexicon and a grammar lexicon 250. In some implementations, the data source lexicon is a unique portion of the lexicon that corresponds to a database. For example, the first data source lexicon 254 is a unique portion of the lexicon that corresponds to the first data source 244. The grammar lexicon 250 is a predefined portion corresponding to the context-free grammar.

In some implementations, the computing device 200 forms (430) the intermediate expression using one or more predefined grammar rules governing the context-free grammar. In some implementations, the predefined grammar rules are specified in Backus-Naur Form.

In some implementations, each predefined grammar rule has (432) a predefined expression type (e.g., the analytical expressions 239). In some implementations, the predefined expression types are: limiting, group, aggregation, filtering, and sort. In other words, the intermediate expressions that are formed are the syntactically viable expressions of the context-free grammar.

In some implementations, the data source lexicon (e.g., the first data source lexicon 254) includes (434) a plurality of fields corresponding to the data fields 276 in the data source. Each of the plurality of fields is mapped to one or more entries (e.g., using elastic search), and each of the entries corresponds to a concept 280.

In some implementations, the plurality of fields in the data source lexicon includes (436) a plurality of synonyms.

In some implementations, the plurality of synonyms includes (438) a first subset that is defined by the user. In some implementations, the first subset comprises aliases 284.

In some implementations, the plurality of synonyms includes (440) a second subset that is predefined by the computing device 200. In some implementations, the second subset comprises synonyms 282. In some implementations, the synonyms are obtained by the computing system 200 from third-party sources (e.g., map service). In some implementations, second subset includes abbreviations of names (e.g., "CA" for California).

In some implementations, the data source lexicon (e.g., the first data source lexicon 254) is generated (442) from the semantic model 248 of the data source. The semantic model 248 comprises names of attributes, values of the attributes, and metadata corresponding to the values.

The computing device translates (444) the intermediate expression into one or more database queries, including the first aggregation, according to the data source. In some implementations, the translating includes using the intermediate expression recursively to create an updated data visualization having a different level of detail (e.g., an LOD 2, as illustrated in FIGS. 3G-3J and the intermediate expressions in Table 500.

The computing device executes (446) the one or more database queries to retrieve one or more data sets from the data source, aggregated according to the first aggregation.

The computing device generates (448) and displays an updated data visualization of the retrieved data sets.

In some implementations, the method 400 further comprises receiving (450) user selection of a plurality of (e.g., distinct) data sources, each associated with a data source lexicon that is specific to the data source. For example, the method comprises receiving user selection of a first data source 244 and a second data source 246. The first data source 244 is associated with a first data source lexicon 254 that is specific to the first data source 244. The second data source 246 is associated with a second data source lexicon 256 that is specific to the second data source 256.

In some implementations, the data sources 244 and 246 share (452) a common grammar lexicon 250.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having a display, one or more processors, and memory storing one or more programs configured for execution by the one or more processors:
receiving user input to specify a natural language command directed to a data source;
in accordance with the user input:
identifying a semantic model for data fields in the data source;
parsing the natural language command according to a context-free grammar and the semantic model to form an intermediate expression including:
(i) a first term, derived from the natural language command, that specifies an aggregation type in a first aggregation;
(ii) a second term, derived from the natural language command, that specifies a data field, in the semantic model, to be aggregated for the first aggregation; and
(iii) one or more terms, derived from the natural language command, that specify data fields, in the semantic model, to specify grouping for the first aggregation;
translating the intermediate expression into one or more database queries, including the first aggregation, according to the data source;
executing the one or more database queries to retrieve one or more data sets from the data source, aggregated according to the first aggregation; and
generating and displaying a data visualization of the retrieved data sets.

2. The method of claim 1, wherein the semantic model includes metadata corresponding to attributes of the data fields.

3. The method of claim 1, wherein parsing the natural language command comprises parsing the natural language command into a plurality of tokens.

4. The method of claim 3, further comprising:
for each token of the plurality of tokens, looking up the respective token in a lexicon to identify a concept corresponding to the respective token.

5. The method of claim 4, wherein the natural language command includes a plurality of words, and parsing the natural language command further comprises:
determining a respective function for each of the plurality of words within a context of the natural language command using the lexicon;
wherein each of the plurality of tokens includes either a single word or a phrase that is formed by combining two or more adjacent words in the natural language command.

6. The method of claim 4, wherein forming the intermediate expression comprises concatenating two or more concepts corresponding to tokens in the plurality of tokens.

7. The method of claim 4, wherein looking up the respective token in the lexicon to identify a concept corresponding to the respective token further comprises:
identifying one or more tokens in the plurality of tokens that do not have corresponding concepts; and
forming the intermediate expression using other tokens in the plurality of tokens that do have corresponding concepts.

8. The method of claim 4, wherein the lexicon includes a data source lexicon and a grammar lexicon.

9. The method of claim 8, wherein:
the data source lexicon includes a plurality of fields corresponding to the data fields in the data source; and
each of the plurality of fields is mapped to one or more entries, each of the entries corresponding to a concept.

10. The method of claim 9, wherein the plurality of fields includes a plurality of synonyms.

11. The method of claim 10, wherein the plurality of synonyms includes a first subset that is defined by the user.

12. The method of claim 10, wherein the plurality of synonyms includes a second subset that is predefined by the computing device.

13. The method of claim 8, wherein the data source lexicon is generated from the semantic model.

14. The method of claim 1, wherein forming the intermediate expression uses one or more predefined grammar rules governing the context-free grammar.

15. The method of claim 14, wherein the predefined grammar rules include a predefined expression type selected from the group consisting of: limiting, group, aggregation, filtering, and sort.

16. The method of claim 1, wherein receiving user input to specify the natural language command comprises receiving the user input via a user interface control in a data visualization interface.

17. The method of claim 1, further comprising receiving user selection of a plurality of data sources, each of the plurality of data sources associated with a respective data source lexicon that is specific to the data source.

18. The method of claim 17, wherein the plurality of data sources share a common grammar lexicon.

19. A computing device, comprising:
one or more processors;
memory coupled to the one or more processors;
a display; and
one or more programs stored in the memory and configured for execution by the one or more processors, the one or more programs comprising instructions for:
receiving user input to specify a natural language command directed to a data source;
in accordance with the user input:
identifying a semantic model for data fields in the data source;
parsing the natural language command according to a context-free grammar and the semantic model to form an intermediate expression including:
(i) a first term, derived from the natural language command, that specifies an aggregation type in a first aggregation;
(ii) a second term, derived from the natural language command, that specifies a data field, in the semantic model, to be aggregated for the first aggregation; and
(iii) one or more terms, derived from the natural language command, that specify data fields, in the semantic model, to specify grouping for the first aggregation;
translating the intermediate expression into one or more database queries, including the first aggregation, according to the data source;
executing the one or more database queries to retrieve one or more data sets from the data source, aggregated according to the first aggregation; and
generating and displaying a data visualization of the retrieved data sets.

20. A non-transitory computer readable storage medium storing one or more programs, the one or more programs comprising instructions that, when executed by a computing device, cause the computing device to perform operations comprising:
receiving user input to specify a natural language command directed to a data source;
in accordance with the user input:
identifying a semantic model for data fields in the data source;
parsing the natural language command according to a context-free grammar and the semantic model to form an intermediate expression including:
(i) a first term, derived from the natural language command, that specifies an aggregation type in a first aggregation;
(ii) a second term, derived from the natural language command, that specifies a data field, in the semantic model, to be aggregated for the first aggregation; and
(iii) one or more terms, derived from the natural language command, that specify data fields, in the semantic model, to specify grouping for the first aggregation;
translating the intermediate expression into one or more database queries, including the first aggregation, according to the data source;
executing the one or more database queries to retrieve one or more data sets from the data source, aggregated according to the first aggregation; and
generating and displaying a data visualization of the retrieved data sets.

* * * * *